United States Patent
Yong

(10) Patent No.: US 10,286,770 B2
(45) Date of Patent: May 14, 2019

(54) POWER TRANSMISSION DEVICE OF HYBRID ELECTRIC VEHICLE

(71) Applicant: HYUNDAI MOTOR COMPANY, Seoul (KR)

(72) Inventor: Jin Woo Yong, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 369 days.

(21) Appl. No.: 14/983,378

(22) Filed: Dec. 29, 2015

(65) Prior Publication Data

US 2016/0368362 A1 Dec. 22, 2016

(30) Foreign Application Priority Data

Jun. 17, 2015 (KR) .................. 10-2015-0085552

(51) Int. Cl.
| | |
|---|---|
| *B60K 6/40* | (2007.10) |
| *B60K 6/387* | (2007.10) |
| *B60K 6/48* | (2007.10) |
| *F16H 1/10* | (2006.01) |

(52) U.S. Cl.
CPC ............... *B60K 6/387* (2013.01); *B60K 6/40* (2013.01); *B60K 6/48* (2013.01); *B60K 2006/4816* (2013.01); *B60K 2006/4825* (2013.01); *B60Y 2200/92* (2013.01); *F16H 1/10* (2013.01); *Y02T 10/6221* (2013.01); *Y02T 10/6252* (2013.01); *Y10S 903/909* (2013.01); *Y10S 903/915* (2013.01); *Y10S 903/951* (2013.01)

(58) Field of Classification Search
CPC .............. B60K 6/50; B60K 2006/4833; B60K 2006/4825; B60K 2006/262; F16H 1/10
See application file for complete search history.

(56) References Cited

U.S. PATENT DOCUMENTS

| | | | | |
|---|---|---|---|---|
| 1,773,288 | A * | 8/1930 | Valletta | ............... F16H 1/10 74/413 |
| 1,836,587 | A * | 12/1931 | Godfrey | ............... F16H 1/10 475/162 |
| 2,100,312 | A * | 11/1937 | Fawick | ............... F16H 3/04 192/53.361 |
| 3,901,096 | A * | 8/1975 | Woody | ............... B60K 17/08 180/339 |

(Continued)

FOREIGN PATENT DOCUMENTS

| | | |
|---|---|---|
| JP | 2002-283857 A | 10/2002 |
| JP | 2014-073756 A | 4/2014 |

(Continued)

*Primary Examiner* — William Kelleher
*Assistant Examiner* — Gregory T Prather
(74) *Attorney, Agent, or Firm* — Morgan Lewis & Bockius LLP

(57) ABSTRACT

A power transmission apparatus of a hybrid electric vehicle HEV has an engine clutch mounted between a driving motor, which is mounted to a front end of a transmission, and an engine. An internal gear unit, in which an inner gear is enmeshed in an outer gear while the inner gear is inserted into the outer gear, is mounted between the engine clutch and the driving motor, so that an output of the engine is transmitted to the transmission while rotational speeds of the engine and the driving motor are not asynchronous when the engine is coupled.

2 Claims, 3 Drawing Sheets

(56) References Cited

U.S. PATENT DOCUMENTS

| | | | | |
|---|---|---|---|---|
| 7,293,543 B1* | 11/2007 | Scekic | F16H 1/10 | 123/198 R |
| 9,893,661 B2* | 2/2018 | Park | H02P 7/2855 | |
| 2004/0110592 A1* | 6/2004 | Yamauchi | B60K 6/365 | 475/5 |
| 2007/0095583 A1* | 5/2007 | Lee | B60K 17/16 | 180/65.25 |
| 2009/0105040 A1* | 4/2009 | Sanji | B60K 6/40 | 477/5 |
| 2010/0037842 A1* | 2/2010 | Hattori | F01L 1/352 | 123/90.15 |
| 2010/0131180 A1* | 5/2010 | Hattori | B60K 6/365 | 701/105 |
| 2010/0162706 A1* | 7/2010 | Sakai | E02F 3/325 | 60/706 |
| 2011/0180341 A1* | 7/2011 | Chan | B62M 6/55 | 180/206.4 |
| 2013/0040773 A1* | 2/2013 | Sugino | B60K 6/365 | 475/5 |
| 2014/0121875 A1* | 5/2014 | Jang | B60W 10/02 | 701/22 |
| 2014/0228160 A1* | 8/2014 | Chung | B60K 6/50 | 475/5 |
| 2014/0297073 A1* | 10/2014 | Jeong | B60W 20/40 | 701/22 |
| 2014/0314608 A1* | 10/2014 | Honda | F04C 2/084 | 418/191 |
| 2014/0342865 A1* | 11/2014 | Hayashi | B60K 6/365 | 475/5 |
| 2014/0360793 A1* | 12/2014 | Aoki | B60K 6/445 | 180/65.23 |
| 2015/0007678 A1* | 1/2015 | Vanneste | F16H 1/10 | 74/421 R |
| 2015/0087476 A1* | 3/2015 | Dzafic | B60K 6/50 | 477/15 |
| 2015/0088348 A1* | 3/2015 | Lee | B60W 10/11 | 701/22 |
| 2015/0100212 A1* | 4/2015 | Moon | B60W 10/06 | 701/68 |
| 2015/0105201 A1* | 4/2015 | Park | B60K 6/365 | 475/5 |
| 2015/0105204 A1* | 4/2015 | Kim | B60K 6/547 | 475/5 |
| 2015/0165891 A1* | 6/2015 | Kumazaki | B60K 6/383 | 475/5 |
| 2015/0175156 A1* | 6/2015 | Kwon | B60W 20/50 | 701/22 |
| 2015/0321545 A1* | 11/2015 | Park | B60W 20/30 | 475/5 |
| 2015/0345353 A1* | 12/2015 | Kim | F01N 3/2006 | 701/22 |
| 2016/0031325 A1* | 2/2016 | Kim | B60L 11/08 | 701/70 |
| 2016/0031436 A1* | 2/2016 | Kim | B60W 20/40 | 701/22 |
| 2016/0082942 A1* | 3/2016 | Park | B60W 20/00 | 701/22 |
| 2016/0129776 A1* | 5/2016 | Choi | B60K 6/36 | 475/5 |
| 2016/0325730 A1* | 11/2016 | Ono | B60K 6/383 | |
| 2016/0368471 A1* | 12/2016 | Cho | B60W 10/06 | |
| 2016/0368484 A1* | 12/2016 | Lee | B60W 10/06 | |
| 2017/0088116 A1* | 3/2017 | Kim | B60W 20/11 | |
| 2017/0129474 A1* | 5/2017 | Sato | B60W 10/08 | |
| 2017/0166213 A1* | 6/2017 | Kim | B60W 30/20 | |
| 2018/0093558 A1* | 4/2018 | Ohnemus | B60K 6/365 | |
| 2018/0319266 A1* | 11/2018 | Kaltenbach | F16H 37/046 | |

FOREIGN PATENT DOCUMENTS

| | | |
|---|---|---|
| KR | 10-0623082 B1 | 9/2006 |
| KR | 10-0647408 B1 | 11/2006 |
| KR | 10-0774666 B1 | 11/2007 |
| KR | 10-2008-0105091 A | 12/2008 |
| KR | 10-2009-0024915 A | 3/2009 |
| KR | 10-2010-0015063 A | 2/2010 |
| KR | 10-2014-0140704 A | 12/2014 |

* cited by examiner

-- Related Art --

-- Related Art --

POWER TRANSMISSION DEVICE OF HYBRID ELECTRIC VEHICLE

CROSS-REFERENCE TO RELATED APPLICATION

This application claims under 35 U.S.C. § 119(a) the benefit of priority to Korean Patent Application No. 10-2015-0085552 filed on Jun. 17, 2015, the entire content of which is incorporated herein by reference.

TECHNICAL FIELD

The present disclosure relates to a power transmission apparatus of a hybrid elective vehicle (HEV), and more particularly, to a power transmission apparatus of a HEV for operating an engine and a motor of the HEV at optimum operation conditions, thereby improving fuel ratio of the HEV.

BACKGROUND

A Hybrid electric vehicle (HEV) is environmentally friendly vehicle in which an engine and an electric motor are used for a power source, and generally, is driven by an electric motor using a battery power source until the vehicle starts and reaches a target speed, and is driven by suitably combining motor power and engine power according to an intention of the driver and a state of a battery.

A transmission mounted electric device (TMED) hybrid electric vehicle is a hybrid electric vehicle to which a TMED is applied, and an electric motor (driving motor) is attached to a transmission. That is, the electric motor is arranged between an engine clutch and a transmission.

The TMED hybrid electric vehicle is also driven by an electric motor using a battery power source until the vehicle starts and reaches a target speed, and an operation mode of the TMED hybrid electric vehicle is largely classified into a HEV mode in which an engine and an electric motor are driven together and an EV mode in which only the electric motor is driven.

FIGS. 1 and 2 are views illustrating a power transmission structure of a TMED hybrid electric vehicle according to the related art.

As illustrated in FIGS. 1 and 2, since a driving motor 3 is mounted between an engine clutch 1 and a transmission 2, speeds of an engine 4 and a driving motor 3 are synchronized when the engine clutch 1 is coupled.

However, in the TMED hybrid vehicle according to the related art, because a rear end of the engine clutch 1 and a rotor 3*a* of the driving motor 3 are fixed to each other, the speeds of the engine 4 and the driving motor 3 become the same when the engine clutch 1 is coupled so that the engine 4 and the driving motor 3 cannot be operated at optimum operation conditions thereof.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-mentioned problems, and provides a power transmission device of a hybrid electric vehicle (HEV) in which an internal gear is mounted between an engine clutch and a driving gear so that an engine and a driving motor are operated at optimum operation conditions with high efficiency.

According to an embodiment in the present disclosure, a power transmission device of a hybrid electric vehicle in which an engine clutch is mounted between a driving motor, which is mounted to a front end of a transmission, and an engine. An internal gear unit in which an inner gear is enmeshed in an outer gear while the inner gear is inserted into the outer gear is mounted between the engine clutch and the driving motor, so that an output of the engine is transmitted to the transmission while rotational speeds of the engine and the driving motor are not asynchronous when the engine is coupled.

The outer gear is fixedly mounted on a rear end of the engine clutch and the inner gear is fixedly mounted on a front end of a rotor of the driving motor.

A gear ratio of the outer gear having a plurality of teeth on an inner peripheral surface thereof and the inner gear having a plurality of teeth on an outer peripheral surface thereof is preferably less than 1.0.

According to the embodiment, engine power can be transmitted to a transmission while operation conditions of the engine and a motor are not synchronous, by mounting an internal gear unit between a rear end of an engine clutch and a front end of a rotor of a driving motor. Accordingly, the speed of the engine becomes lower and the speed of the driving motor becomes higher by using the optimum operation conditions for high efficiency as the operation conditions of the engine and the motor, so that the driving efficiency of the system can be further enhanced and fuel ratio can be improved.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

Figure 1:
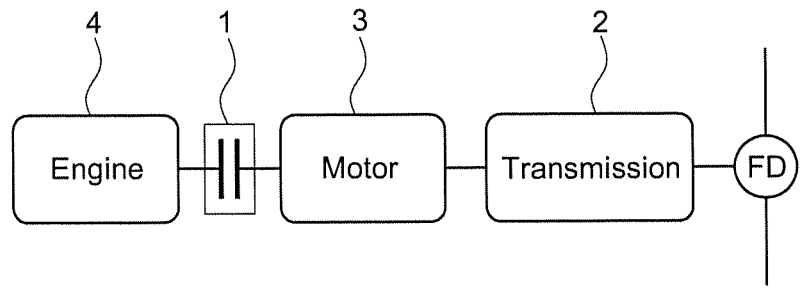
FIGS. 1 and 2 are views illustrating a power transmission apparatus of a TMED hybrid electric vehicle according to the related art.
Figure 2:
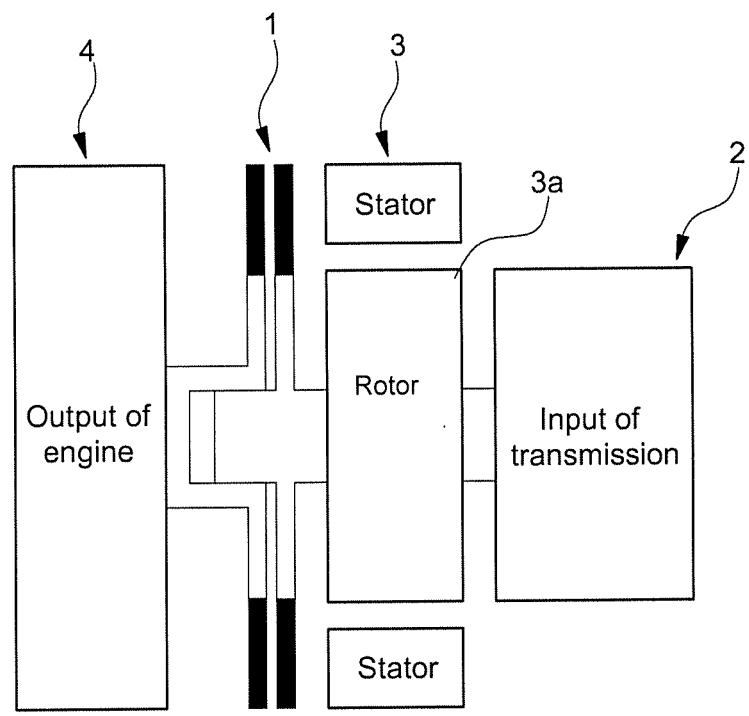

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 3:
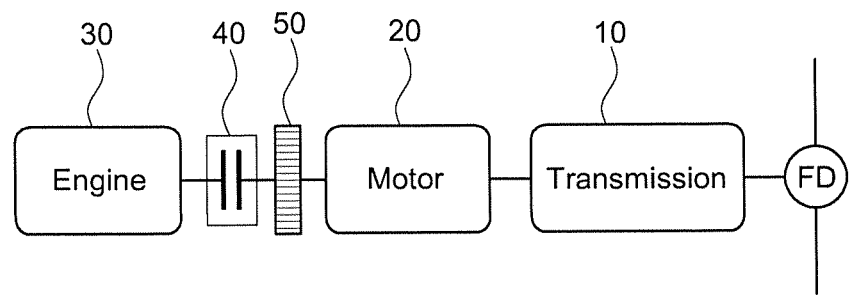
FIGS. 3 and 4 are views illustrating a power transmission apparatus of a TMED hybrid electric vehicle according to an embodiment in the present disclosure.
Figure 4:
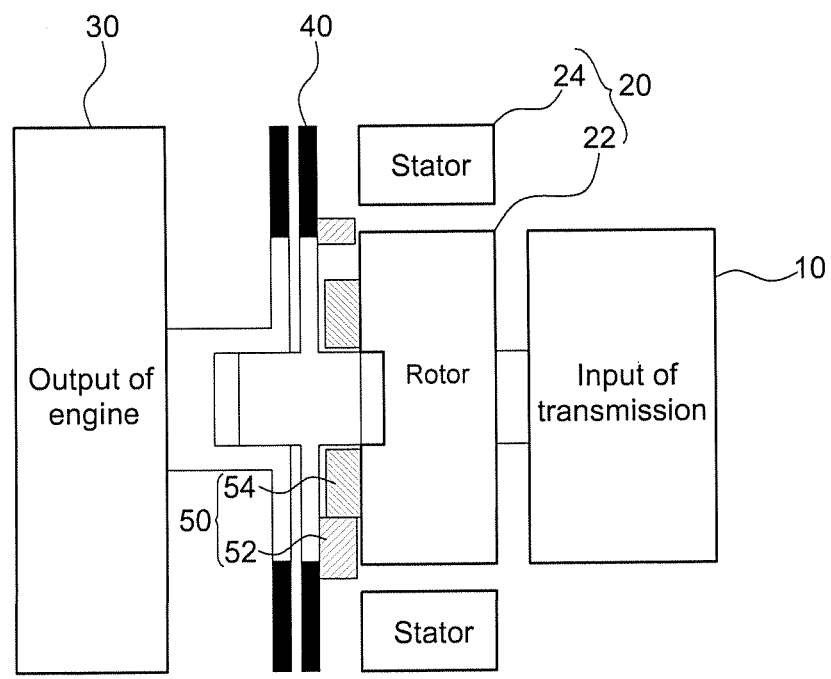
Figure 5:
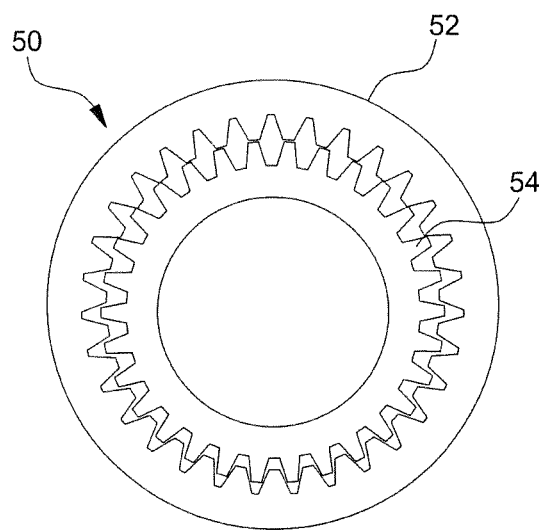
FIG. 5 is a view illustrating an internal gear unit according to an embodiment in the present disclosure.

As illustrated in FIGS. 3 and 4, a power transmission apparatus of a hybrid electric vehicle (HEV) according to the present disclosure has a driving motor 20 attached to a front end of a transmission 10, an engine 30 mounted to a front end of the driving motor 20, and an engine clutch 40 mounted between the driving motor 20 and the engine 30 are arranged in a row. An internal gear unit 50 is mounted between the engine clutch 40 and the driving motor 20.

As known in the art, the transmission 10 receives an output of the engine 30 and an output of the driving motor 20 and supplies the outputs to driving wheels.

The engine clutch 40 transmits the output of the engine 30 to the transmission 10. Power is transmitted between an output shaft of the engine 30 and an input shaft of the transmission if the engine clutch 40 is coupled and the power transmission between the output shaft of the engine 30 and the input shaft of the transmission 10 is interrupted if the engine clutch 40 is not coupled.

The internal gear unit 50 transmits the output of the engine to the transmission 10 while rotational speeds of the engine 30 and the driving motor 20 are not synchronized if the engine clutch 40 is coupled. The internal gear unit 50 includes an outer gear 52 fixedly mounted on a rear end of the engine clutch 40 and an inner gear 54 fixedly mounted on a front end of a rotor 22 rotatably installed inside a stator 24 of the driving motor 20.

That is, the output shaft of the engine 30 is fixedly mounted on a front end of the engine clutch 40 while the output shaft of the engine 30 and the engine clutch 40 have the same center of rotation. The outer gear 52 is fixedly mounted on a rear end of the engine clutch 40 while the outer gear 52 and the engine clutch 40 have the same center of rotation. The rotor 22 of the driving motor 20 is mounted to the input shaft of the transmission 10 while the rotor 22 of the driving motor 20 and the input shaft of the transmission have the same center of rotation. The inner gear 54 is fixedly mounted on a front end of the rotor 22 while the inner gear 54 and the rotor 22 have the same center of rotation.

A plurality of teeth are formed on an inner peripheral surface of the outer gear 52, and a plurality of teeth are formed on an outer peripheral surface of the inner gear 54. The inner gear 54 is enmeshed in an inside of the outer gear 52 while being inserted into the outer gear 52.

Then, a gear ratio of the outer gear 52 to the inner gear 54 is a value obtained by dividing the number of teeth of the larger gear (the outer gear) by the number of teeth of the smaller gear (the inner gear) of the engaged gears. The gear ratio is set to be less than 1.0 and the inner gear 54 is assembled inside the outer gear 52 while being partially enmeshed in the outer gear 52.

Accordingly, when the power of the engine 30 is transmitted to the transmission 10 while the engine clutch 40 is coupled, the outer gear 52 rotates while being fixed to a rear end of the engine clutch 40. The inner gear 54 rotates while being fixed to a front end of the rotor 22 of the driving motor 20, and the outer peripheral surface of the inner gear 54 remains partially enmeshed in the inner peripheral surface of the outer gear 52.

Accordingly, when the gear ratio of the inner gear 54 and the outer gear 52 is less than 1.0, and the engine 30 and the motor 20 can be optimally operated at high efficiency operation conditions by adjusting the gear ratio.

For example, when the gear ratio is set such that the inner gear 54 rotates 1.2 times while the outer gear 52 rotates once, the rotational speed of the engine 30 decreases and a rotational speed of the rotor 22 of the driving motor 20 increases as compared with a case in which the speeds of the engine 30 and the motor 20 are synchronized, so that the engine 30 and the driving motor 20 may be optimally operated at the high efficiency operation conditions.

In general, the maximum efficiency section of the engine is 1000 to 2500 RPM, and the maximum efficiency section of the driving motor is 2500 to 3500 RPM. In a fuel ratio mode of a hybrid electric vehicle, the main operation conditions (driving conditions) of the engine and the driving motor are 1500 to 2000 RPM.

Accordingly, the operation condition of the engine is selected from a low speed section and the operation condition of the driving motor is selected from a high speed section.

As mentioned above, when the internal gear unit 50 having a gear ratio of less than 1.0 is mounted between the engine 30 and the driving motor 20, the operation point of the engine moves to a relatively lower speed/high load area and the operation condition of the motor moves to a high speed/low load area. Accordingly, the driving efficiency of the system may be enhanced and fuel ratio can be improved.

Furthermore, because the internal gear unit 50 is disposed between the engine clutch 40 and the driving motor 20, a change of design of the power transmission structure of an existing hybrid electric vehicle in which an output shaft of the engine and an input shaft of the transmission are arranged on the same axis line (that is, in which the engine, the driving motor, and the transmission are arranged in a row) may be minimized, and thus, fuel ratio may be improved.

Although not illustrated in the drawings, the internal gear unit 50 according to the present disclosure may be applied to a TMED HEV on which a hybrid starter generator (HSG) is mounted or a clutch is mounted between the motor and the transmission. Here, the internal gear unit is mounted between the motor and the clutch, thereby expecting the above-mentioned effects.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A power transmission apparatus of a hybrid electric vehicle in which an engine clutch is mounted between a driving motor, which is mounted to a front end of a transmission, and an internal combustion engine mounted to a front end of the driving motor, wherein an internal gear unit, in which an inner gear is enmeshed in an outer gear while the inner gear is inserted into the outer gear, is mounted between the engine clutch and the driving motor, so that an output of the engine is transmitted to the transmission while rotational speeds of the engine and the driving motor are asynchronous when the engine clutch is coupled, wherein the outer gear is fixedly mounted on a rear end of the engine clutch and the inner gear is fixedly mounted on a front end of a rotor of the driving motor.

2. The power transmission apparatus of claim 1, wherein a gear ratio of a number of teeth on an inner peripheral surface of the outer gear to a number of teeth on an outer peripheral surface of the inner gear is less than 1.0.

\* \* \* \* \*